United States Patent [19]

Kunimune et al.

[11] Patent Number: 4,959,437

[45] Date of Patent: Sep. 25, 1990

[54] PROCESSES FOR PRODUCING A LOW THERMALLY EXPANSIVE AND HIGHLY ADHESIVE SILICON-CONTAINING POLYIMIDE AND A PRECURSOR THEREOF

[75] Inventors: Kouichi Kunimune, Ichiharashi; Yoshiya Kutsuzawa, Yokohamashi; Shiro Konotsune, Yokosukashi, all of Japan

[73] Assignee: Chisso Corporation, Osaka, Japan

[21] Appl. No.: 200,894

[22] Filed: Jun. 1, 1988

[30] Foreign Application Priority Data

Jun. 29, 1987 [JP] Japan ................... 62-162018

[51] Int. Cl.$^5$ .............. C08G 77/26; C08G 73/10; B05D 3/02; B32B 27/28
[52] U.S. Cl. ........................... 528/26; 528/28; 528/38; 528/182; 528/188; 528/224; 528/229; 528/351; 528/353; 427/154; 427/155; 427/387; 427/389.9; 427/393.5; 428/446; 428/473.5; 428/480
[58] Field of Search ............ 528/353, 26, 28, 38, 528/128, 188, 224, 229, 351; 427/387, 389, 393.5, 154, 155; 428/446, 473.5, 480

[56] References Cited

U.S. PATENT DOCUMENTS

| | | | |
|---|---|---|---|
| 3,926,911 | 12/1975 | Greber et al. | 528/26 |
| 3,948,835 | 4/1976 | Greber et al. | 525/431 |
| 3,950,308 | 4/1976 | Greber et al. | 528/26 |
| 4,499,252 | 2/1985 | Igarashi et al. | 528/38 |
| 4,591,653 | 5/1986 | Kunimune et al. | 556/419 |
| 4,672,099 | 6/1987 | Kunimune et al. | 528/26 |
| 4,748,228 | 5/1988 | Shoji et al. | 528/353 |

*Primary Examiner*—John Kight, III
*Assistant Examiner*—P. Hampton-Hightower
*Attorney, Agent, or Firm*—Fred Philpitt

[57] ABSTRACT

A process for producing a silicon-containing polyamic acid affording a silicon-containing polyimide having a low thermal expansion coefficient and a process for producing the silicon-containing polyimide are provided, the former process comprising reacting pyromellitic acid dianhydride ($A^1$ mols) and 3,3′,4,4′-biphenyl-tetracarboxylic acid dianhydride ($A^2$ mols) with a diamine of the following formula (I) (B mols) and an aminosilicon compound of the formula (II) so as to satisfy the following expressions (III) and (IV):

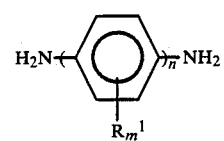

(I)

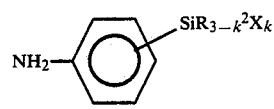

(II)

$$0.1 \leq \frac{A^2}{A^1 + A^2} \leq 0.95 \quad \text{(III)}$$

$$0.05 \leq \frac{C}{B + C} \quad \text{(IV)}$$

wherein $R^1$ is methyl, ethyl, methoxy, ethoxy or halogen; $R^2$ is alkyl or alkyl-substituted phenyl; X is a hydrolyzable alkoxy, acetoxy or halogen; m is 0, 1 or 2; n is 1 or 2; and k is 1, 2 or 3; and the latter process comprising baking a solution of the above silicon-containing polyamic acid at 50° to 500° C.

7 Claims, No Drawings

PROCESSES FOR PRODUCING A LOW THERMALLY EXPANSIVE AND HIGHLY ADHESIVE SILICON-CONTAINING POLYIMIDE AND A PRECURSOR THEREOF

BACKGROUND OF THE INVENTION

This invention relates to a process for producing a precursor of a silicon-containing polyimide and a process for curing a solution containing the same.

Heretofore, polyimide resins have often been used for heat-resistant films, coating agents, adhesives for making the resins composite with inorganic materials or metallic materials, etc. In this case, if the inorganic materials are silicon-containing compounds such as glass, a number of copolymers containing silicon compounds in the precursors of polyimides have been proposed as a means for improving the adhesion of polyimides.

For example, Japanese patent application laid-open Nos. Sho 57-143328/1982, Sho 58-7473/1983 and Sho 58-13631/1983 disclose a process wherein a polyimidesiloxane copolymer is prepared from a polyimide precursor obtained by replacing a portion of a diamine as a raw material by a polysiloxane terminated at both the ends thereof by a diamine. In this case, improvement in the adhesion to a certain extent has been observed, but instead a problem has been raised that the polymerization degree of the copolymer is reduced with the increase in the siloxane content in the copolymer.

Further, Japanese patent publication Nos. Sho 58-18372/1983, Sho 58-32162/1983 and Sho 58-32163/1983 disclose a process wherein a suitable carboxylic acid derivative such as a tetracarboxylic acid dianhydride is reacted with a diamine to form a polyamide carboxylic acid having a terminal group such as an acid anhydride, followed by reacting one mol of this polyamide carboxylic acid with at least two mols of an aminosilicon compound at a temperature of $-20°$ C. to $+50°$ C. to obtain a silicon-containing polyamide carboxylic acid prepolymer, using this prepolymer, as it is, i.e. without any imidization to obtain an organosilicon-modified polyimide precursor, or imidizing the prepolymer by chemically cyclizing (imidizing) the prepolymer in the presence of a dehydrating agent under a mild condition (at a low temperature, preferably at $50°$ C. or lower, particularly at $-20°$ C. to $+25°$ C.), to obtain an organosilicon-modified polyimide precursor, and heating these precursors in the presence or absence of a silanediol or siloxanediol in solution state to complete its imidization and also effect cross-linking and thereby obtain the objective polyimidesiloxane. According to the process, however, adhesion to silicon compounds has been improved to a certain extent, but when the polyimide obtained according to the process is subjected to heat history over a broad temperature range, the resulting adhesion is inferior. In order to improve the adhesion, the thermal expansion coefficient of the polyimide should be lowered.

On the other hand, Japanese patent application laid-open Nos. Sho 60-32827/1985, Sho 60-250031/1985, Sho 61-60725/1986 and Sho.61-241325/1986 propose a biphenyltetracarboxylic acid or pyromellitic acid polyimide having a low thermal expansion coefficient. However, the measurement of the coefficient of these polyimides has been carried out at temperatures of $300°$ C. or lower, but the values rapidly increase at $400°$ C. to $500°$ C. Further, adhesion thereof with inorganic materials is inferior.

In general, the thermal expansion coefficients of polyimides at room temperature to $450°$ C. are at the least about $3 \times 10^{-5}$ deg$^{-1}$, whereas those of metals or inorganic materials are of an order around $10^{-5}$ to $10^{-6}$ deg$^{-1}$. For example, stainless steel of type 410 (annealed): 11, cast iron: 12.1, industrial purified copper: 17, polycrystalline glass: 5.8, silica glass: 0.5 to 0.8, borosilicate glass: 3.0 to 6.0; and porcelein: 4.5, each $\times 10^{-6}$ deg$^{-1}$, see Handbook of Chemical Engineering (edited by Japan Chemical Engineering Association, issued by Maruzen Company). Accordingly, when polyimides are made composite with these inorganic materials to prepare composite materials or used as adhesives for the materials, it is necessary to improve their adhesion and at the same time reduce their thermal expansion coefficiencies and thereby approach those of the materials. The present inventors have made extensive research for the above purpose, and as a result have achieved the present invention and also the present invention is the one having improved a process previously proposed by some of the present inventors (Japanese patent application laid-open No. Sho 61-287926/1986) in the aspect of the thermal expansion coefficient.

SUMMARY OF THE INVENTION

The present invention resides in a process for producing a silicon-containing polyamic acid having an inherent viscosity of 0.05 to 5 dl/g as measured in a solvent of N-methyl-2-pyrrolidone in a concentration of 0.5 g/dl at $30°\pm0.01°$ C., which process comprises reacting acid anhydries consisting of $A^1$ in the mol number of pyromellitic acid dianhydride (hereinafter abbreviated to PMDA) and $A^2$ in the mol number of 3,3', 4,4'-biphenyltetracarboxylic acid dianhydride (hereinafter abbreviated to BPDA) with B in the mol number of a diamine expressed by the following formula (I) and C in the mol number of an aminosilicon compound expressed by the following formula (II) so as to satisfy the following expressions (III) and (IV):

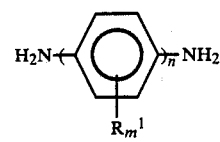

(I)

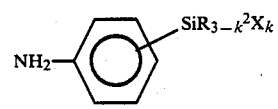

(II)

$$0.1 \leq \frac{A^2}{A^1 + A^2} \leq 0.95 \quad \text{(III)}$$

$$0.05 \leq \frac{C}{B + C} \quad \text{(IV)}$$

in the above formulas (I) and (II), $R^1$ represents methyl group, ethyl group, methoxy group, ethoxy group or a halogen atom; $R^2$ represents an alkyl group of 1 to 6 carbon atoms, phenyl group or a phenyl group substituted by an alkyl group of 7 to 12 carbon atoms; X represents a hydrolyzable alkoxy group, acetoxy group or a halogen atom; m represents 0, 1 or 2; n represents 1 or 2; and k represents 1, 2 or 3, and a process for producing a silicon-containing polyimide which comprises baking a solution of the above-mentioned polyamic acid in a solvent at 50° to 500° C. to vaporize off the solvent and at the same time subject the resulting compound to crosslinking.

DETAILED DESCRIPTION OF PREFERRED EMBODIMENTS

The suitable range of the average molecular weight of the polyamic acid obtained according to the present invention is 0.05 to 5 dl/g in terms of the inherent viscosity value measured under the above-mentioned specified conditions, and the polyamic acid is soluble in a suitable solvent.

The inherent viscosity value ($\eta$ inh) referred to herein is as defined by the above-mentioned measurement conditions, and in more detail, it is expressed by the formula $$\eta\ inh = \frac{\ln \eta/\eta_0}{C}$$

wherein $\eta$ refers to a value obtained by using an Ubbellhode viscometer and measuring a solution of the acid in N-methyl-2-pyrrolidone in a concentration of 0.5 g/dl at 30° C.±0.01° C.; $\eta_0$ refers to a value obtained by using the Ubbellhode viscosimeter and measuring the same solvent at the same temperature; and C refers to a concentration of 0.5 g/dl.

Next, the raw materials used in the present invention will be described.

The tetracarboxylic acid dianhydrides consist of pyromellitic acid dianhydride and 3,3',4,4'-biphenyltetracarboxylic acid dianhydride.

Further, concrete examples of the diamine expressed by the formula (I) are p-phenylenediamine, 2-methyl-1,4-diaminobenzene, 2,5-dimethyl-1,4-diaminobenzene, benzidine, 3,3'-dimentyl-4,4'-diaminobiphenyl, 3,3'-dimethoxy-4,4'-diaminobiphenyl, 2-chloro-1,4-diaminobenzene, 2,5-dichloro-1,4-diaminobenzene, etc.

Further, examples of the aminosilicon compound expressed by the formula (II) are as follows:

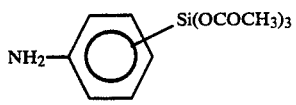

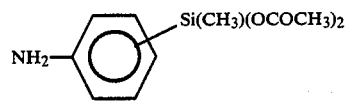

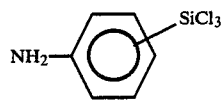

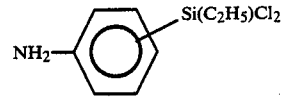

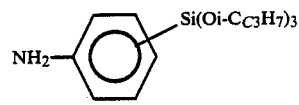

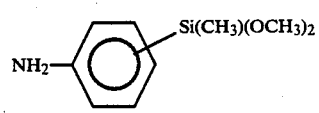

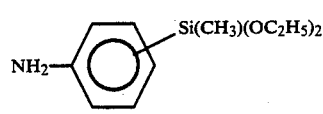

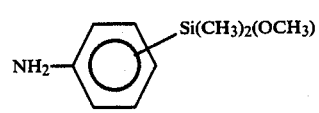

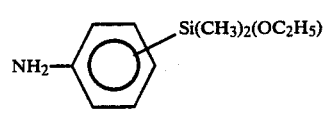

Among the compounds expressed by the formula (II), amino compounds expressed by the formula (VI)

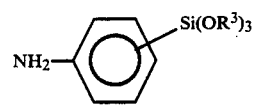  (VI)

wherein $R^3$ represents methyl group or ethyl group, are preferred. Because, when this compound is used, the coating obtained from the coating solution containing the polyamic acid obtained according to the process of the present invention has a superior heat resistance and a far superior hardness.

Examples of preferred solvents for reacting the above-mentioned raw materials in a solvent (hereinafter referred to often as reaction solvent) are N-methyl-2-pyrrolidone, N,N-dimethylacetamide, N,N-dimethylformamide, dimethylsulfoxide, tetramethylurea, pyridine, dimethylsulfone, hexamethylphosphoroamide, methylformamide, N-acetyl-2-pyrrolidone, toluene, xylene, ethylene glycol monomethyl ether, ethylene glycol monoethyl ether, ethylene glycol monobutyl ether, diethylene glycol monomethyl ether, diethylene glycol dimethyl ether, cyclopentanone, cyclohexanone, etc. These solvents may be used singly or in admixture, and also may be used as a mixed solvent thereof with other solvents in 30% by weight or more.

Next, the reaction process will be described.

$A^1$ in the mol number of PMDA and $A^2$ in the mol number of BPDA are reacted with B in the mol number of a diamine expressed by the formula (I) and C in the mol number of an aminosilicon compound expressed by the formula (II) in a reaction solvent. At that time, $A^1$, $A^2$, B and C are determined so that the relationship of the expressions (III) and (IV) can come into existence among these mols. If the value of $$\frac{A^2}{A^1 + A^2}$$

in the expression (III) is less than 0.1, the resulting reaction solution is ununiform and sometimes contains a partly insoluble component and the coating obtained from the reaction solution has an uneven surface to reduce its practical value. On the other hand, if the value of $$\frac{A^2}{A^1 + A^2}$$

exceeds 0.95, reduction in the thermal expansion coefficient of molded products formed from the resulting polymer is not always sufficient. If the value of $$\frac{C}{B + C}$$

in the expression (IV) is less than 0.05, the total atom number of Si may be sometimes reduced to lower the adhesion of the coating formed from the polyamic acid obtained according to the reaction of the present invention, onto silicon or silicon compounds.

Further, if the values of $A^1$, $A^2$, B and C are determined so that a relationship expressed by the formula (V)

$$1 \leq \frac{C}{A^1 + A^2 - B} \leq 1.8 \quad (V)$$

can come into existence among them, a silicon-containing polyimide having a particularly high adhesion is obtained.

As to the reaction solvent, it is preferred to use it in 40% by weight or more based on the total quantity by weight of the solvent and the raw materials added. If the quantity is less than 40% by weight, agitating operation is sometimes difficult.

It is preferred to carry out the reaction in the range of 0° C. to 80° C. The reaction time is preferably in the range of 0.2 to 40 hours.

As to the addition order of the reaction raw materials to the reaction system, the total quantities of the tetracarboxylic dianhydrides, the diamine and the aminosilicon compound may be at the same time added to the reaction solvent and reacted together, alternatively the respective total quantities of the former two (i.e. the tetracarboxylic acid dianhydrides and the diamine) may be reacted together in advance, followed by adding the aminosilicon compound to the resulting reaction product and reacting the mixture or the respective portions of the former two may be reacted together in advance, followed by reacting the remainder of the former two which contains at least the former two with the aminosilicon compound. When the aminosilicon compound is lastly added, a polymer having a higher molecular weight is liable to be obtained. As to the two kinds of the tetracarboxylic acid dianhydrides, it is preferred to add BPDA in advance or add a mixture of BPDA with PMDA at the same time, followed by reaction. It is possible thereby to obtain a uniform and transparent reaction solution. According to the most preferred reaction process, the total quantity of the diamine is reacted with nearly equal mols thereto of a mixture of PMDA with BPDA containing therein BPDA in at least 30% by mol based on the total mols of the acid anhydrides, (the terms "nearly equal mols" referred to herein mean that the quantities of the acid anhydrides relative to the quantity of the diamine fall within the range of 0.9 to 1.1 mol), followed by adding additional quantities of the acid anhydrides and the aminosilicon compound expressed by the formula (II) and reacting the mixture. It is possible thereby to obtain a reaction solution which is uniform and transparent and has a higher viscosity. Thus, it is possible to obtain a silicon-containing polyamic acid which has an adequate inherent viscosity value of 0.05 to 5 dl/g and hence an adequate molecular weight and is soluble in solvents.

If the inherent viscosity value is less than 0.05 dl/g, the coated state of the coating solution is inferior and hence formation of the coating is insufficient, while if it exceeds 5 dl/g, the polyamic acid is difficultly soluble or insoluble and hence difficult for practical use. When the resulting solution containing the silicon-containing polyamic acid is baked at 50° to 500° C, it is possible to vaporize the solvent and at the same time subject the resulting compound to crosslinking and curing. Thus, a silicon-containing polyimide having an improved adhesion to inorganic materials is formed.

In the reaction according to the process of the present invention, compounds expressed by the following formulas (VII), (VIII) and (IX) are obtained as main products, and unreacted aminosilicon compound expressed by the formula (II) may sometimes be coexistent therewith:

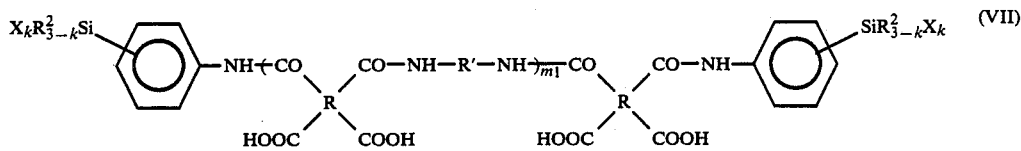

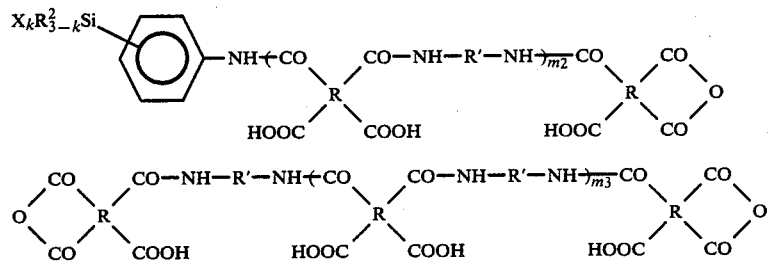

(VIII)

(IX)

wherein R represents

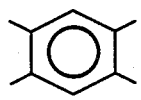 and/or  ;

R' represents

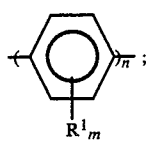 ;

$R^1$, $R^2$, X, m and k are as defined above; and $m_1$, $m_2$ and $m_3$ each represent 0 or a positive integer. When these compounds are coated on an object to be coated and baked, the polyamic acids are dehydrated and cyclized to form an imide bond, and at the same time, through condensation reaction after hydrolysis of X as a hydrolyzable group present at the end of the molecule, the polyamic acids are converted into higher molecular substances to form a tough coating. Further, when the aminosilicon compound expressed by the formula (II) is present in excess, this excess compound causes a condensation reaction with the aminosilicon group present at the end of the polymer at the time of the baking, whereby it is taken in the polymer. When the acid anhydride groups are present at the end of the polyamic acid, it is considered that the groups react with formed water or moisture in the atmosphere to form carboxylic acids. When Si and in cases, the carboxylic acids in the resulting polymer are present within the range defined by the expression (IV), preferably within the ranges defined by the expressions (IV) and (V), the polymer affords a polyimide exhibiting a superior adhesion onto substrates such as silicon compounds, metals, inorganic compounds, etc. Further, since the polyimide obtained from the polyamic acid of the present invention has, in most cases, a thermal expansion coefficient (defined in Note 1 described below) less than $2 \times 10^{-5}$, that is, close to those of metals or inorganic compounds, it has a sufficient adhesion durability relative to heat history at room temperature to 500° C.

Note 1: as to the coefficient, a thermomechanical analyzer (TM-7000, a trademark of an instrument manufactured by Shinku Riko Company) was used and its average value at 30° to 450° C. was sought.

Since the polyamic acid produced according to the present invention is, in most cases, used in a solution state thereof dissolved in a solvent as in the case of varnish, etc., it may be used as it is or it is preferred to concentrate the solution obtained according to the process of the present invention or dilute the solution with a solvent. Such a solvent used may be the same as the reaction solvent. As to the process for forming molded products from the solution of the polyamic acid obtained according to the present invention, any known processes may be employed. For example, the solution of the plyamic acid is cast on glass plate, copper plate, aluminum plate or the like, and then the resulting material is heated, whereby the solvent is removed and at the same time the amic acid bond is converted into an imide bond by dehydration and crosslinking proceeds due to siloxane bond to form a tough coating. In order to form a laminated composite material, although it is possible to successively carry out such operations, a varnish containing the polyamic acid produced according to the present invention is applied as an adhesive between a plurality of heterogeneous materials, followed by baking, to make it possible to obtain a laminated composite material.

As to the varnish containing the polyamic acid produced according to the present invention, the varnish may be further coated on a once baked and cured coating made from the varnish and then baked, whereby it is also possible to laminate a coating onto a coating. When fillers, glass fibers, etc. are impregnated with the varnish, followed by baking and curing, it is also possible to form a laminated material using a reinforced coating.

Although the baking conditions vary depending on the solvent used, the thickness of coating, etc., those of 50° to 500° C., preferably 250° to 350° C. and about 0.5 to 1.5 hour may be sufficient.

As to the application fields of the polyamic acid obtained according to the process of the present invention, composite materials thereof with metallic materials such as iron, stainless steels, copper, aluminum, etc. or inorganic materials such as silicon compounds, or an adhesive for these metallic or inorganic materials may be illustrated, and besides, when the polyamic acid is used as a high molecular material in a technical field directed to a liquid crystal-alinging agent or the like, good results are exhibited.

Since the silicon-containing polyamic acid produced according to the present invention has an adequate inherent viscosity value, its solution has an adequate viscosity and coating may be well carried out.

Further, by baking, imidization is carried out and at the same time siloxane bonding proceeds through condensation, whereby a hard and tough coating is formed by intermolecular bonding. At the same time, by adequately balancing the quantity of the carboxyl group formed from the acid anhydride group present at the end of the polymer, with the quantity of silicon, that is, by choosing the composition of the raw materials, the resulting material exhibits a superior adhesion not only onto silicon compounds such as glass, metallic materials such as copper plate, aluminum plate, etc., but also surprisingly enough onto the polyimide coating itself made according to the present invention. Moreover, the adhesion has a sufficient durability over a broad temperature range of room temperature to 500° C. Such a superior adhesion thereof with many kinds of substrates exhibits superior specific features. When the polyamic acid is used as a material for multi-layer composite materials or as an adhesive, superior specific features are exhibited.

The present invention will be described in more detail by way of Examples and Comparative examples.

EXAMPLE 1

A 1 l capacity flask equipped with an agitator, a dropping funnel, a thermometer, a condensor and a nitrogen gas-purging means was fixed in cold water. After purging the inside of the flask with nitrogen gas, dehydrated and purified N-methyl-2-pyrrolidone (hereinafter abbreviated to NMP) (500 ml), p-phenylenediamine (hereinafter abbreviated to PDA) (20.11 g, 0.186 mol), BPDA (32.84 g, 0.112 mol) and PMDA (24.35 g, 0.112 mol) were fed in the flask, followed by reacting the mixture with stirring for 6 hours, during which the reaction temperature was 15° to 30° C. 4-Aminophenyltrimethoxysilane (12.70 g, 0.0595 mol) was then fed, followed by reacting the mixture at 20° to 30° C. for 3 hours to obtain a polyamic acid composition of the present invention as a pale yellow transparent solution.

The polyamic acid contained in the solution had an inherent viscosity of 1.2 dl/g as measured in NMP as a solvent.

EXAMPLE 2

Employing the same apparatus and manner as in Example 1, NMP (500 ml), PDA (25.41 g, 0.235 mol), BPDA (20.75 g, 0.0705 mol) and PMDA (35.89 g, 0.165 mol) were fed in the flask, followed by reacting the mixture at 20° to 35° C. for 10 hours, thereafter adding PMDA (51.27 g, 0.235 mol) and 4-aminophenyltrimethoxysilane (85.24 g, 0.400 mol) and reacting the mixture at 20° to 30° C. for 3 hours to obtain a polyamic acid composition of the present invention as a pale yellow transparent solution.

The polyamic acid contained in the solution had an inherent viscosity of 0.81 dl/g as measured in NMP as a solvent.

EXAMPLE 3

Employing the same apparatus and manner as in Example 1, NMP (500 ml), a mixture of 4-aminophenyltrimethoxysilane with 3-aminophenyltrimethoxysilane (3.39 g, 0.0159 mol) (the content of 3-aminophenyltrimethoxysilane: 63%), PDA (17.17 g, 0.159 mol), BPDA (42.06 g, 0.143 mol) and PMDA (6.93 g, 0.0318 mol) were fed in the flask, followed by reacting the mixture at 20° to 40° C. for 10 hours to obtain a polyamic acid composition of the present invention as a pale yellow transparent solution.

The polyamic acid contained in the solution had an inherent viscosity of 1.4 dl/g as measured in NMP as a solvent.

EXAMPLE 4

Employing the same apparatus and manner as in Example 1, NMP (500 ml), PDA (20.31 g, 0.188 mol) and BPDA (55.27 g, 0.188 mol) were fed in the flask, followed by reacting the mixture at 10° to 20° C. for 22 hours, thereafter adding 4-aminophenyltrimethoxysilane (22.71 g, 0.106 mol) and PMDA (13.66 g, 0.0626 mol) and reacting the mixture at 20° to 30° C. for 3 hours to obtain a polyamic acid composition of the present invention as a pale yellow transparent solution.

The polyamic acid contained in the solution had an inherent viscosity of 1.1 dl/g as measured in NMP as a solvent.

EXAMPLE 5

Employing the same apparatus and manner as in Example 1, NMP (500 ml), PDA (13.23 g, 0.122 mol), BPDA (24.00 g, 0.0816 mol) and PMDA (8.90 g, 0.0408 mol) were fed in the flask, followed by reacting the mixture at 10° to 25° C. for 8 hours, thereafter adding PMDA (4.45 g, 0.0204 mol) and 4-aminophenyltrimethoxysilane (6.10 g, 0.0286 mol) and reacting the mixture at 20° to 30° C. for 5 hours to obtain a polyamic acid composition of the present invention as a pale yellow transparent solution.

The polyamic acid contained in the solution had an inherent viscosity of 2.1 dl/g as measured in NMP as a solvent.

EXAMPLE 6

Employing the same apparatus and manner as in Example 1, NMP (500 ml), 3,3'-dimethyl-4,4'-diaminobiphenyl (17.75 g, 0.0836 mol), BPDA (16.40 g, 0.0557 mol) and PMDA (3.04 g, 0.0139 mol) were fed in the flask, followed by reacting the mixture at 20° to 30° C. for 15 hours, thereafter adding 4-aminophenyltrimethoxysilane (5.05 g, 0.0237 mol) and BPDA (8.20 g, 0.0279 mol) and reacting the mixture at 20° to 30° C. for 7 hours to obtain a polyamic acid composition of the present invention as a pale yellow transparent solution.

The polyamic acid contained in the solution had an inherent viscosity of 1.5 dl/g as measured in NMP as a solvent.

EXAMPLE 7

Employing the same apparatus and manner as in Example 1, NMP (500 ml), PDA (13.82 g, 0.128 mol), 4-aminophenyltrimethoxysilane (5.45 g, 0.0256 mol), BPDA (18.81 g, 0.0639 mol) and PMDA (18.59 g, 0.0852 mol) were fed in the flask, followed by reacting the mixture at 15° to 30° C. for 24 hours to obtain a polyamic acid composition of the present invention as a pale yellow transparent solution.

The polyamic acid contained in the solution had an inherent viscosity of 1.1 dl/g as measured in NMP as a solvent.

COMPARATIVE EXAMPLE 1

Employing the same apparatus and manner as in Example 1, NMP (500 ml), PDA (16.82 g, 0.156 mol), BPDA (22.89 g, 0.0778 mol) and PMDA (16.97 g, 0.0778 mol) were fed in the flask, followed by reacting the mixture at 20° to 30° C. for 15 hours to obtain a polyamic acid composition as a pale yellow transparent solution.

The polyamic acid contained in the solution has an inherent viscosity of 2.5 dl/g as measured in NMP as a solvent.

COMPARATIVE EXAMPLE 2

Employing the same apparatus and manner as in Example 1, NMP (500 ml), PDA (16.92 g, 0.157 mol), PMDA (40.95 g, 0.188 mol) and 4-aminophenyltrimethoxysilane (11.68 g, 0.0548 mol) were fed in the flask, followed by reacting the mixture at 20° to 35° C. for 20 hours, but no transparent solution was obtained and the resulting product remained a turbid liquid. This fact of the turbid state evidences that the liquid was heterogeneous and means that a film prepared therefrom has projections and depressions and hence the product has no practical value.

COMPARATIVE EXAMPLE 3

Employing the same apparatus and manner as in Example 1, NMP (500 ml), 4,4'-diaminopdiphenyl ether (21.05 g, 0.105 mol), 3,3',4,4'-benzophenonetetracarboxylic acid dianhydride (40.65g, 0.126 mol) and 4-aminophenyltrimethoxysilane (7.85 g, 0.0368 mol) were fed in the flask, followed by reacting the mixture at 15° to 30° C. for 12 hours to obtain a polyamic acid composition as a pale yellow transparent solution.

The polyamic acid contained in the solution had an inherent viscosity of 1.9 dl/g as measured in NMP as a solvent.

COMPARATIVE EXAMPLE 4

Employing the same apparatus and manner as in Example 1, NMP (500 ml), 4,4'-diaminodiphenyl ether (21.05 g, 0.105 mol), 3,3',4,4'-benzophenonetetracarboxylic acid dianhydride (40.65 g, 0.126 mol) and 4-aminophenyltrimethoxysilane (8.97 g, 0.0421 mol) were fed in the flask, followed by reacting the mixture at 15° to 30° C., for 12 hours to obtain a polyamic acid composition as a pale yellow transparent solution.

The polyamic acid contained in the solution had an inherent viscosity of 1.9 dl/g as measured in NMP as a solvent.

For reference, the quantities of the raw materials $A^1$, $A^2$, B and C used in Examples 1 to 7 and Comparative examples 1 to 4 and the values of $$\frac{A^2}{A^1 + A^2}, \frac{C}{B + C} \text{ and } \frac{C}{A^1 + A^2 - B}$$

are shown in Table 1.

baking them at 300° C. for one hour to form coatings of 1 to 2 μm thick. The respective three kinds of coatings prepared from 10 kinds of the coating solutions were each notched to finely divide each coating into small square pieces of 2 mm side, followed by applying a cellophane tape onto the coating and just thereafter stripping off it. The respective numbers of the small pieces of the coating stripped off along with the cellophane tape per 100 small pieces thereof at that time are shown in the column of adhesion in Table 2. As apparent from the results shown in the Table, the polyimide of the present invention has a superior adhesion onto various substates.

EXAMPLE 9

Various kinds of coating solutions obtained in Examples and Comparative examples shown in Table 1 were each uniformly coated onto a polyester film by means of a coater, followed by drying the resulting films in a dryer at 100° C. for one hour to remove most part of the solvent and thereby form a film thereon. This film was stripped off from the polyester film, followed by fixing the film at its periphery by means of two iron plates and then baking it in an electric furnace in nitrogen atmosphere at 200° C. for one hour and successively at 350° C. for one hour to obtain a polyimide film of about 40 μm thick. This film was heated from room temperature up to 450° C. in nitrogen atmosphere by means of a thermo-mechanical analyzer (TM-700, trademark of an instrument manufactured by Shinku Riko Company) to observe the quantity of its length changed and thereby seek its thermal expansion coefficient (linear expansion coefficient). As to the thermal expansion coefficient, its average value at 30° to 450° C. was sought. The results are shown in Table 2. As apparent from the results, the polyimide of the present invention has a small thermal expansion coefficient over a broad temperature range.

TABLE 1

| Nos. of Example and Comp. ex. | $A^1$ (mol) | $A^2$ (mol) | B (mol) | C (mol) | $\frac{A^2}{A^1 + A^2}$ | $\frac{C}{B + C}$ | $\frac{C}{A^1 + A^2 - B}$ |
|---|---|---|---|---|---|---|---|
| Example 1 | 0.112 | 0.112 | 0.186 | 0.0595 | 0.500 | 0.242 | 1.57 |
| Example 2 | 0.165 + 0.235 = 0.400 | 0.0705 | 0.235 | 0.400 | 0.150 | 0.630 | 1.70 |
| Example 3 | 0.0318 | 0.143 | 0.159 | 0.0159 | 0.818 | 0.0909 | 1.01 |
| Example 4 | 0.0626 | 0.188 | 0.188 | 0.106 | 0.750 | 0.361 | 1.69 |
| Example 5 | 0.0408 + 0.0204 = 0.0612 | 0.0816 | 0.122 | 0.0286 | 0.571 | 0.190 | 1.38 |
| Example 6 | 0.0139 | 0.0557 + 0.0279 = 0.0836 | 0.0836 | 0.0237 | 0.857 | 0.221 | 1.71 |
| Example 7 | 0.0852 | 0.0639 | 0.128 | 0.0256 | 0.429 | 0.167 | 1.21 |
| Comp. ex. 1 | 0.0778 | 0.0778 | 0.156 | 0 | 0.500 | 0 | — |
| Comp. ex. 2 | 0.188 | 0 | 0.157 | 0.0548 | 0 | 0.259 | 1.77 |
| Comp. ex. 3 | (0.126) | — | (0.105) | 0.0368 | — | — | — |
| Comp. ex. 4 | (0.126) | — | (0.105) | 0.0421 | — | — | — |

EXAMPLE 8

The following adhesion tests were carried out:

Various kinds of coating solutions obtained in Examples and Comparative examples shown in Table 1 were respectively coated onto the respective surfaces of a slide glass, an aluminum sheet and a copper sheet, by means of a spinner, followed by preliminarily drying the resulting materials at 100° C. for one hour and then

TABLE 2

| Nos. of Example and Comp. ex. | Thermal expansion coefficient ($\times 10^{-5}$ deg$^{-1}$) | Adhesion onto slide glass | Adhesion onto Al plate | Adhesion onto Cu plate |
|---|---|---|---|---|
| Example 1 | 0.9 | 0 | 0 | 0 |
| Example 2 | 0.8 | 0 | 0 | 0 |
| Example 3 | 1.8 | 0 | 0 | 0 |
| Example 4 | 1.1 | 0 | 0 | 0 |
| Example 5 | 1.3 | 0 | 0 | 0 |
| Example 6 | 1.6 | 0 | 0 | 0 |
| Example 7 | 1.5 | 0 | 0 | 0 |
| Comp. 1 | 3.1 | 100 | 0 | 100 |

TABLE 2-continued

| Nos. of Example and Comp. ex. | Thermal expansion coefficient ($\times 10^{-5}$ deg$^{-1}$) | Adhesion onto slide glass | Adhesion onto Al plate | Adhesion onto Cu plate |
|---|---|---|---|---|
| Comp. 3 ex. | 8.2 | 0 | 0 | 0 |
| Comp. 4 ex. | 8.2 | 0 | 30 | 30 |

What we claim is:

1. A process for producing a silicon-containing polyamic acid having an inherent viscosity of 0.05 to 5 dl/g as measured in a solvent of N-methyl-2-pyrrolidone in a concentration of 0.5 g/dl at 30°±0.01° C., which process comprises reacting
   (1) anhydrides consisting of $-A^1$ mols of pyromellitic acid dianhydride (hereinafter abbreviated to PMDA) and $-A^2$ mols of 3,3′,4,4′-biphenyltetracarboxylic acid dianhydride (hereinafter abbreviated to BPDA) with
   (2) B mols of a diamine having the formula

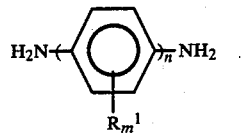

and with
   (3) C mols of an aminosilicon compound selected from the group

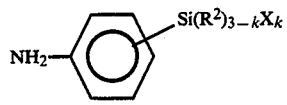

and

wherein $R^3$ represents a methyl group or an ethyl group and
-wherein in (2) and (3)
   $R^1$ represents a methyl, ethyl, methoxy or ethoxy group or a halogen atom,
   $R^2$ represents an alkyl group of 1-6 carbon atoms a phenyl group or a phenyl group substituted by an alkyl group of 7-12 carbon atoms,
   X represents a hydrolyzable alkoxy group, an acetoxy group or a halogen atom,
   m represents 0, 1 or 2;
   n represents 1 or 2; and k represents 1, 2 or 3, the amounts of said reactants being present in quantities to satisfy the expressions:

$$0.1 \leq \frac{A^2}{A^1 + A^2} \leq 0.95 \quad \text{(III)}$$

and $$0.05 \leq \frac{C}{B + C} \quad \text{(IV)}$$

said silicon-containing polyamic acid having the property that when a solution of said acid in N-methyl-2-pyrrolidone is coated onto a polyester film by means of a coater, followed by drying the resulting film in a dryer at 100° C. for one hour to remove most of the solvent to thereby form a film thereon, stripping off this film from said polyester film, fixing the stripped off film at its periphery by means of two iron plates and baking it at 200° C. for one hour and successively at 350° C. for one hour, then a polyimide film having about 40 μm thick and an average thermal expansion coefficient at 30° C. to 450° C. of 0.8 to $1.8 \times 10^{-5}$ deg $^{-1}$ is obtained.

2. A process according to claim 1 wherein the total quantity of said diamine is reacted with a nearly equal quantity of a mixture of PMDA and BPDA wherein the BPDA constitutes at least 30% of the total of said mixture, followed by adding additional quantities of PMDA or BPDA or both PMDA and BPDA and said aminosilicon compound, and then reacting the resulting mixture.

3. A process according to claim 1 wherein the quantities of the reactants satisfy the following expression:

$$1 \leq \frac{C}{A^1 + A^2 - B} \leq 1.8 \quad \text{(V)}$$

4. A process according to claim 2 wherein quantities of the reactants satisfy the following expression:

$$1 \leq \frac{C}{A^1 + A^2 - B} \leq 1.8 \quad \text{(V)}$$

5. A process for producing a silicon-containing polyimide, which process comprises baking a solution of a silicon-containing polyamic acid produced according to claim 1 dissolved in a solvent, at 50° to 50020 C. to thereby vaporize said solvent and also subject said silicon-containing polyamic acid to crosslinking.

6. A process according to claim 1 wherein said silicon-containing polyamic acid further has the property that when it is coated onto the respective surfaces of a slide glass, an aluminum sheet and a copper sheet by means of a spinner, followed by preliminary drying the resulting materials at 10020 C. for one hour, baking them at 300° C. for one hour to form coatings of 1 to 2 μm thick, notching the respective three kinds of coatings to finely divide each coating into small square pieces of 2 mm side, applying a cellophane tape onto the coating and thereafter stripping it off, then the respective numbers of the small pieces of the coating stripped off along with the cellophane tape per 100 small pieces thereof at that time are zero.

7. A process according to claim 1 wherein said amino-silicon compound has the formula

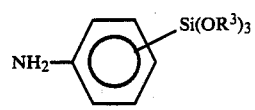

wherein $R^3$ represents a methyl group or an ethyl group.

* * * * *